(12) United States Patent
Myszka

(10) Patent No.: US 6,983,841 B2
(45) Date of Patent: Jan. 10, 2006

(54) MEDIA STORAGE CONTAINER WITH LETTERS SPLIT BETWEEN BASE AND LID WALLS

(75) Inventor: Kevin E. Myszka, Kent, OH (US)

(73) Assignee: Nexpak Corporation, Uniontown, OH (US)

( * ) Notice: Subject to any disclaimer, the term of this patent is extended or adjusted under 35 U.S.C. 154(b) by 176 days.

(21) Appl. No.: 10/685,833

(22) Filed: Oct. 14, 2003

(65) Prior Publication Data

US 2005/0023159 A1    Feb. 3, 2005

Related U.S. Application Data

(60) Provisional application No. 60/419,053, filed on Oct. 15, 2002.

(51) Int. Cl.
*B65D 85/57* (2006.01)

(52) U.S. Cl. ............................... 206/308.1; 206/459.5; 206/387.1

(58) Field of Classification Search ......... 206/308.1 X, 206/309–312, 387.1, 387.13, 459.5 X
See application file for complete search history.

(56) References Cited

U.S. PATENT DOCUMENTS

| 2,648,156 | A | * | 8/1953 | Colgate | 446/79 |
| 2,751,072 | A | * | 6/1956 | Ditmar | 206/457 |
| 2,872,031 | A | * | 2/1959 | Lindberg | 229/125.015 |
| 2,885,839 | A | * | 5/1959 | Weiss | 53/398 |
| 3,225,914 | A | * | 12/1965 | Klein et al. | 206/582 |
| 4,472,896 | A | * | 9/1984 | Brauner et al. | 40/312 |
| 4,717,021 | A | * | 1/1988 | Ditzig | 206/387.13 |

* cited by examiner

*Primary Examiner*—Jila M. Mohandesi
(74) *Attorney, Agent, or Firm*—Zollinger & Burleson Ltd.

(57) ABSTRACT

The invention provides a media storage container having a base and lid connected by a hinge with base and lid front walls disposed opposite the hinge. The base and lid front walls or sidewalls of the container include portions of the title of the item of recorded media within the container such that a complete title is viewable when the container is closed. In one embodiment, the invention provides printed letters on the base and lid. Another embodiment of the invention provides raised letters that are built into the base and lid.

16 Claims, 12 Drawing Sheets

MEDIA STORAGE CONTAINER WITH LETTERS SPLIT BETWEEN BASE AND LID WALLS

CROSS REFERENCE TO RELATED APPLICATIONS

This application claims priority from U.S. provisional application Ser. No. 60/419,053 filed Oct. 15, 2002; the disclosures of which are incorporated herein by reference.

BACKGROUND OF THE INVENTION

1. Technical Field

The present invention generally relates to media storage containers. More particularly, the present invention relates to a media storage container having letters or word portions disposed on opposed walls that join together to form whole letters or words when the media storage container is closed. Specifically, the invention relates to a media storage container having a base and lid connected by a hinge with base and lid front walls disposed opposite the hinge. The base and lid front walls of the container include portions of the title of the item of recorded media within the container such that a complete title is viewable when the container is closed.

2. Background Information

Various media storage containers are known in the art. Most media storage containers include a base and a lid connected at a hinge. The hinge typically presents a hinge wall or a spine. The printed material that identifies the contents of the media storage container usually positions the title of the contents along this hinge wall or spine. Retailers and media owners must position this wall outwardly so that the identity of the media may be readily ascertained when the media is stored alongside other items of recorded media. The art desires a media marking method that provides a second wall that may be used to identify the contents of the storage container.

BRIEF SUMMARY OF THE INVENTION

The invention provides one embodiment wherein a letter or a word is provided on the opposed front wall portions of the base and lid that are disposed opposite the spine. The words are split longitudinally so that they join to form a whole letter or a whole word when the container is closed. The letter or word may represent the title of the media disposed within the container.

In one embodiment, the invention provides printed letters on the base and lid. Another embodiment of the invention provides raised letters that are built into the base and lid.

In one embodiment, the invention provides a media storage container having a base and lid connected by a hinge with base and lid front walls disposed opposite the hinge. The base and lid front walls of the container include portions of the title of the item of recorded media within the container such that a complete title is viewable when the container is closed.

BRIEF DESCRIPTION OF THE SEVERAL VIEWS OF THE DRAWINGS

Similar numbers refer to similar parts throughout the specification.

DETAILED DESCRIPTION OF THE INVENTION

Figure 1:
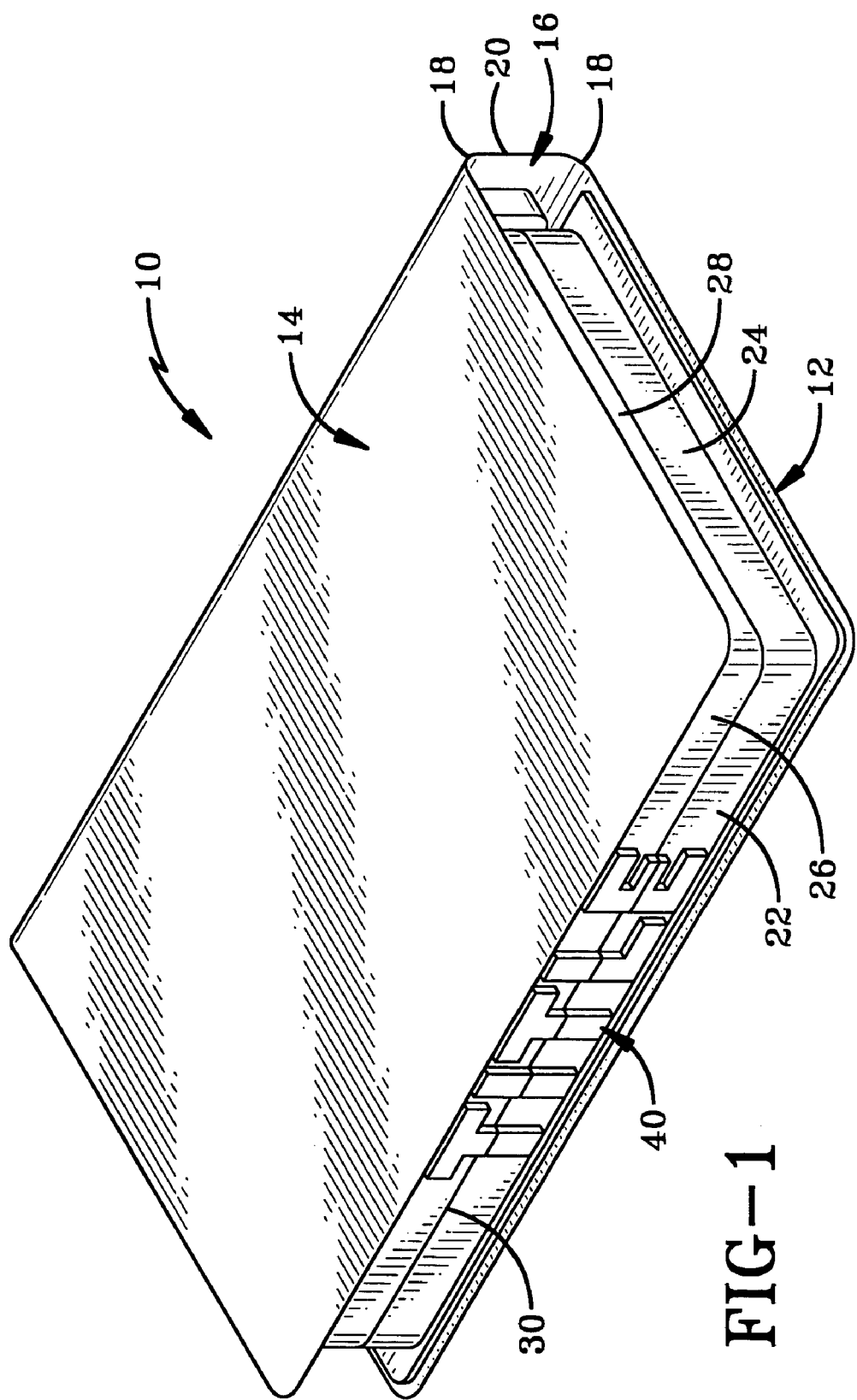
FIG. 1 is a perspective view of a first embodiment of a media storage container made in accordance with the concepts of the present invention.
Figure 2:
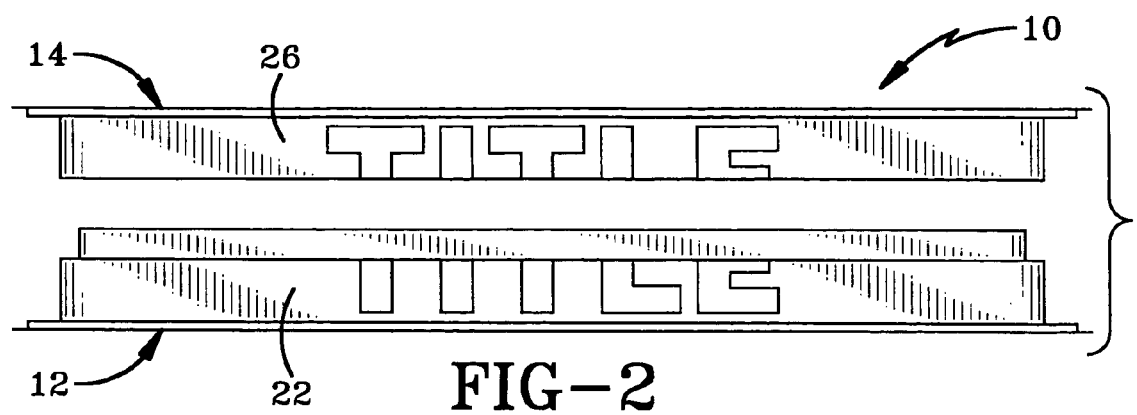
FIG. 2 is a front elevation view of the front wall portions of the media storage container of FIG. 1 with the front wall portions in a partially open configuration.

The first embodiment of a media storage container made in accordance with the concepts of the present invention is indicated generally by the numeral 10 in FIGS. 1–4. Container 10 generally includes a base 12 and a lid 14 that are connected together with a hinge 16. Hinge 16 may include a pair of living hinges 18 spaced apart by a hinge wall 20.

Base 12 and lid 14 move between open and closed configurations with the closed configuration depicted in FIG. 1. When in the closed configuration, base 12 and lid 14 cooperate together to define a storage compartment that is adapted to receive at least one item of recorded media. Base 12 or lid 14 may include suitable retaining devices such as hubs or walls adapted to receive and hold the item of recorded media.

Base 12 includes a front wall 22 and a pair of sidewalls 24. Lid 14 includes a front wall 26 and a pair of sidewalls 28. In the embodiment of the invention depicted in the drawings, the line of division 30 between base 12 and lid 14 is disposed at approximately half of the height of container 10. As such, the height of walls 22, 24, 26, and 28 are substantially equal.

Container 10 includes at least one letter or a word 40 presented on front walls 22 and 26 disposed opposite of hinge wall 20. Letter or word 40 is split between wall 22 and wall 26 such that a whole letter or word is formed when container 10 is closed and unformed when container 10 is open (see FIG. 2). Letter or word 40 may be the title of the item of recorded media stored within container 10.

Figure 3:
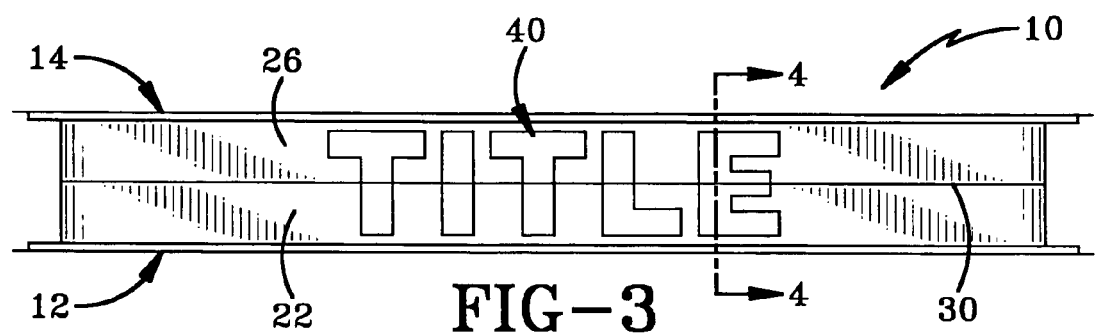
FIG. 3 is a front elevation view of the front wall portions in a closed configuration.
Figure 4:
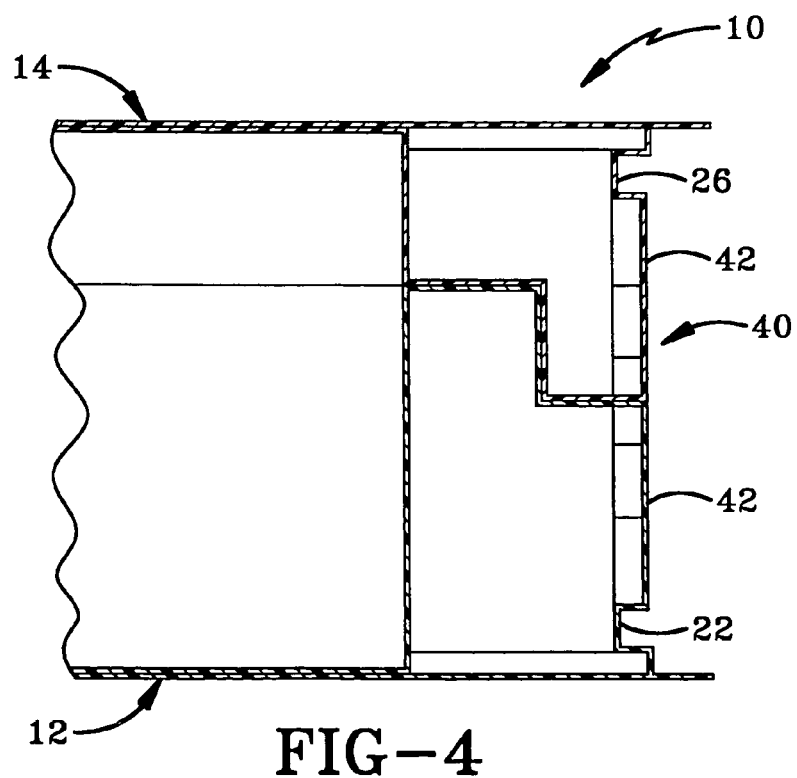
FIG. 4 is a section view taken along line 4—4 of FIG. 3.

In container 10, each letter 40 is raised with respect to front wall 22 and 26 (FIG. 4). Letter 40 may also be recessed with respect to front wall 22 and 26. As such, the upper surface 42 of each letter 40 is spaced from wall 22 and 26. Word 40 may be disposed horizontally as depicted in FIG. 3 or vertically (not shown) by turning each letter 40 ninety degrees. Placing letter of word 40 on front walls 22 and 26 in this manner allows storage container 10 to be identified when a person looks at either end of container 10.

Figure 5:
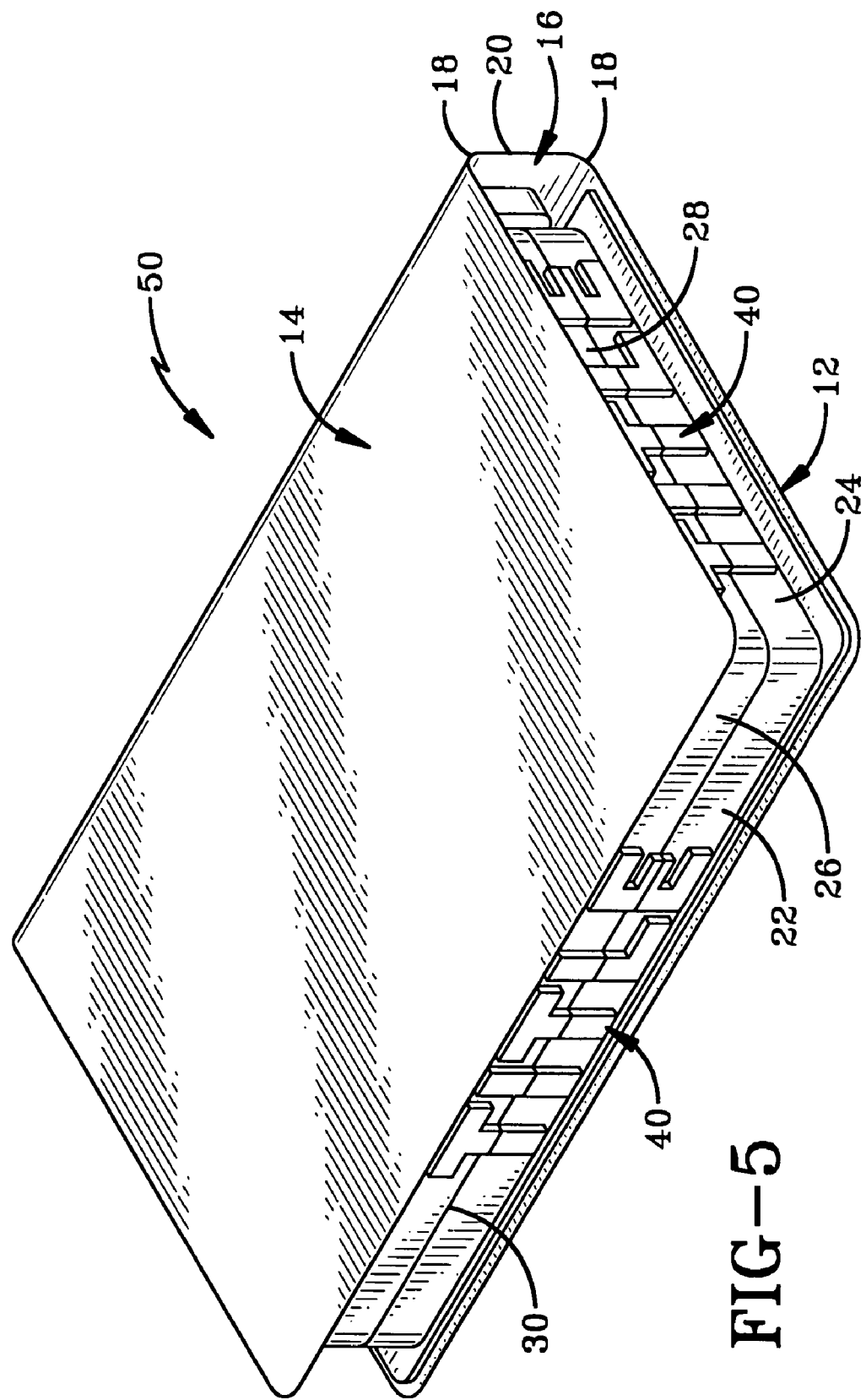
FIG. 5 is a perspective view of a second embodiment wherein words are formed on the front walls and sidewalls.
Figure 6:
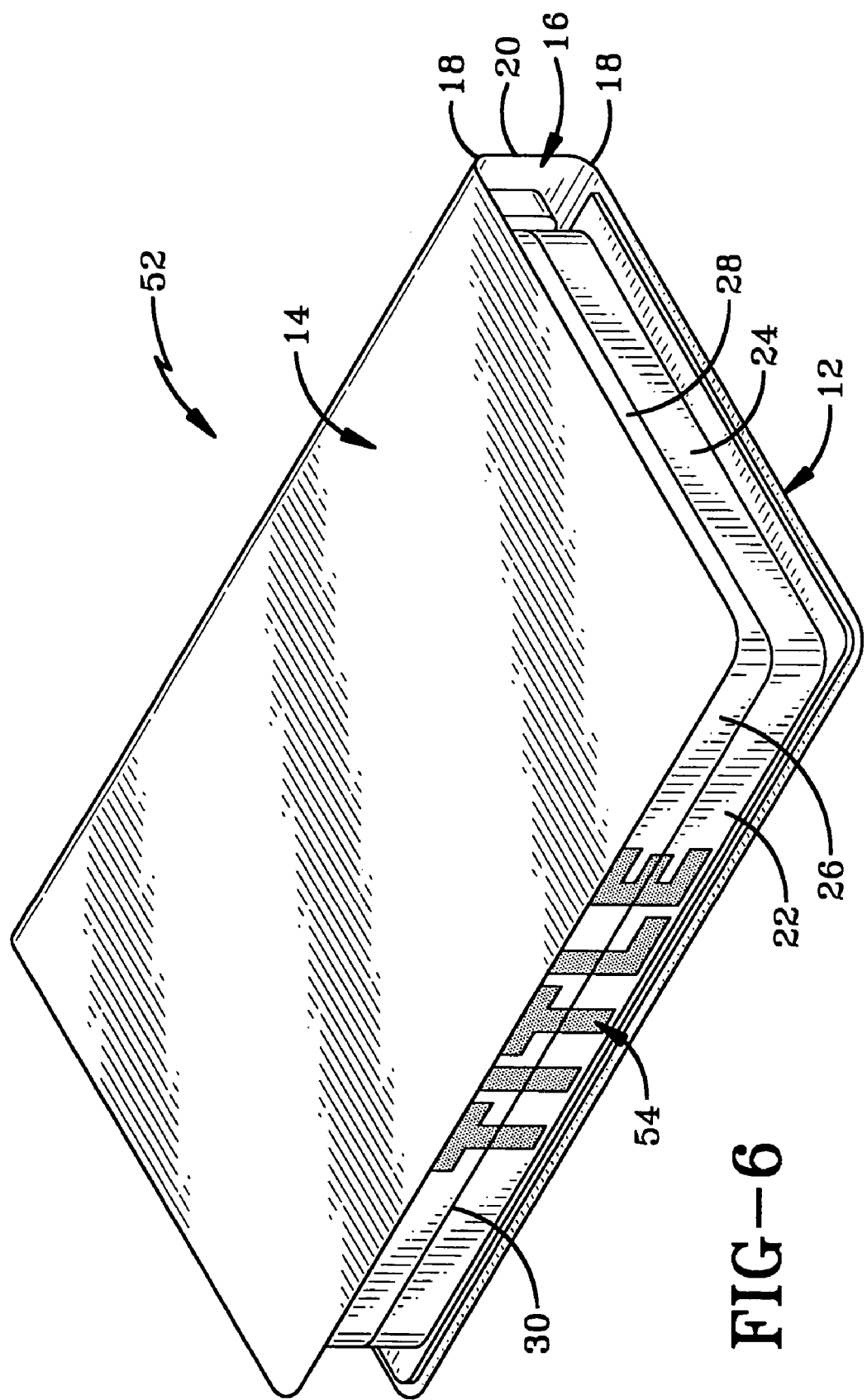
FIG. 6 is a perspective view of a third embodiment wherein the word portions are printed onto the front walls of the base and lid.
Figure 7:
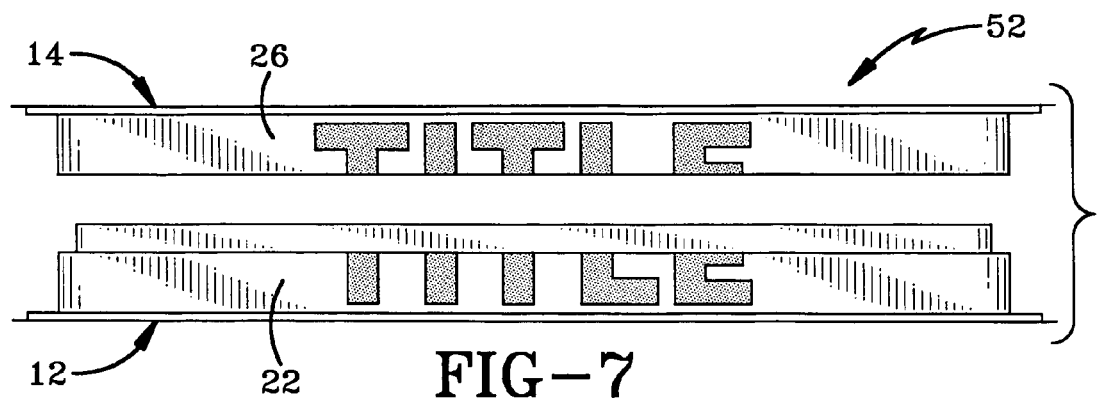
FIG. 7 is a front elevation view of FIG. 6 showing the base and lid in a partially open configuration.
Figure 8:
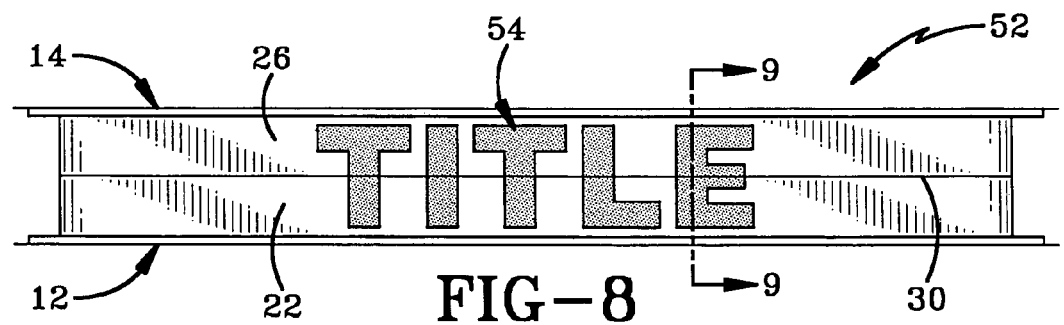
FIG. 8 is a front elevation view of FIG. 6 showing the base and lid in a closed configuration.
Figure 9:
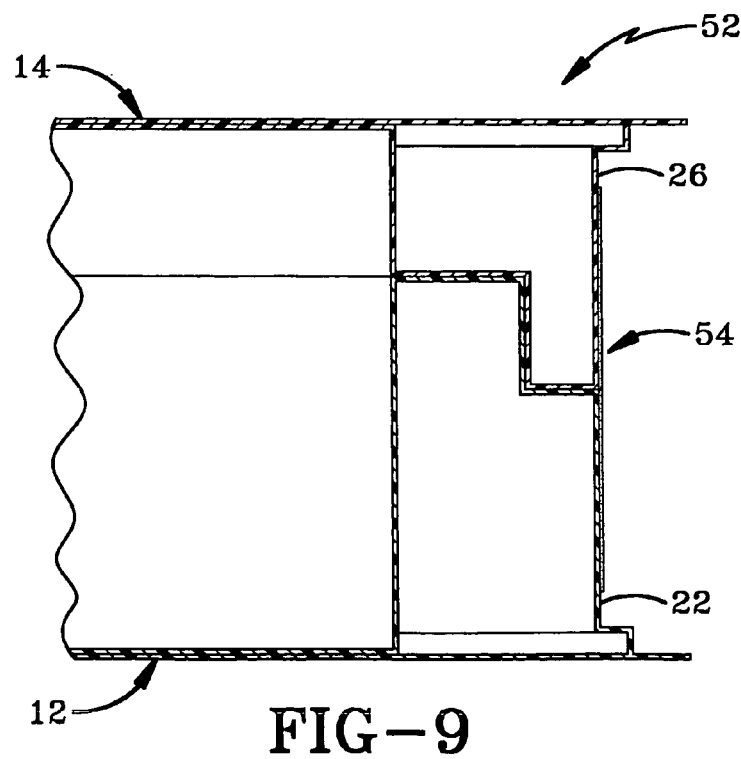
FIG. 9 is a section view taken along line 9—9 of FIG. 8.

The second embodiment 50 is depicted in FIG. 5 wherein a letter or a word 40 is also disposed on sidewalls 24 and 28.

The third embodiment 52 is depicted in FIGS. 6–9. Container 52 includes at least one letter or a word 54 disposed on walls 22 and 26. Letter 54 is printed directly onto the outer surface of walls 22 and 26.

Figure 10:
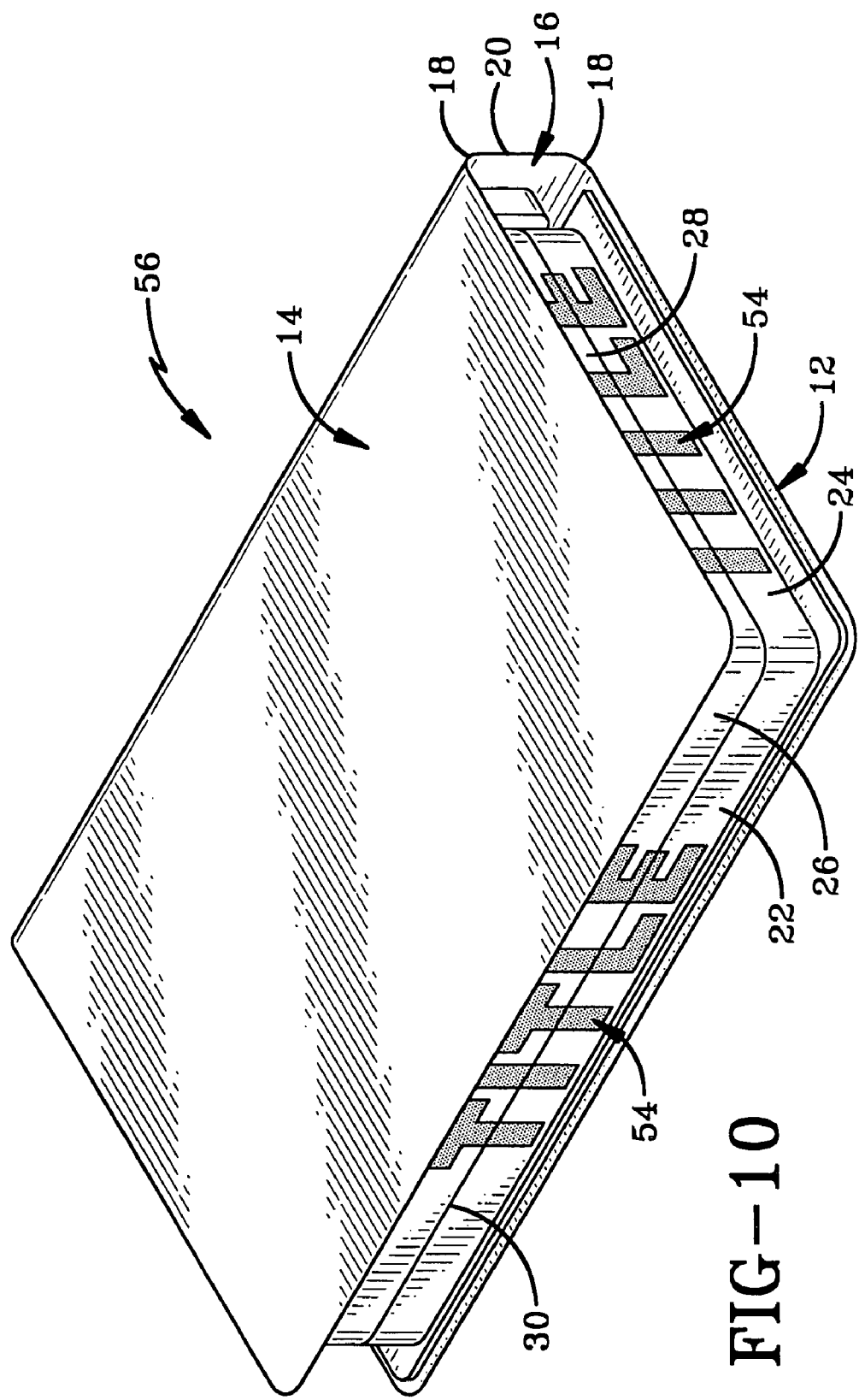
FIG. 10 is a perspective view of a fourth embodiment of the invention wherein printed words are positioned on the front walls and sidewalls of the container.
Figure 11:
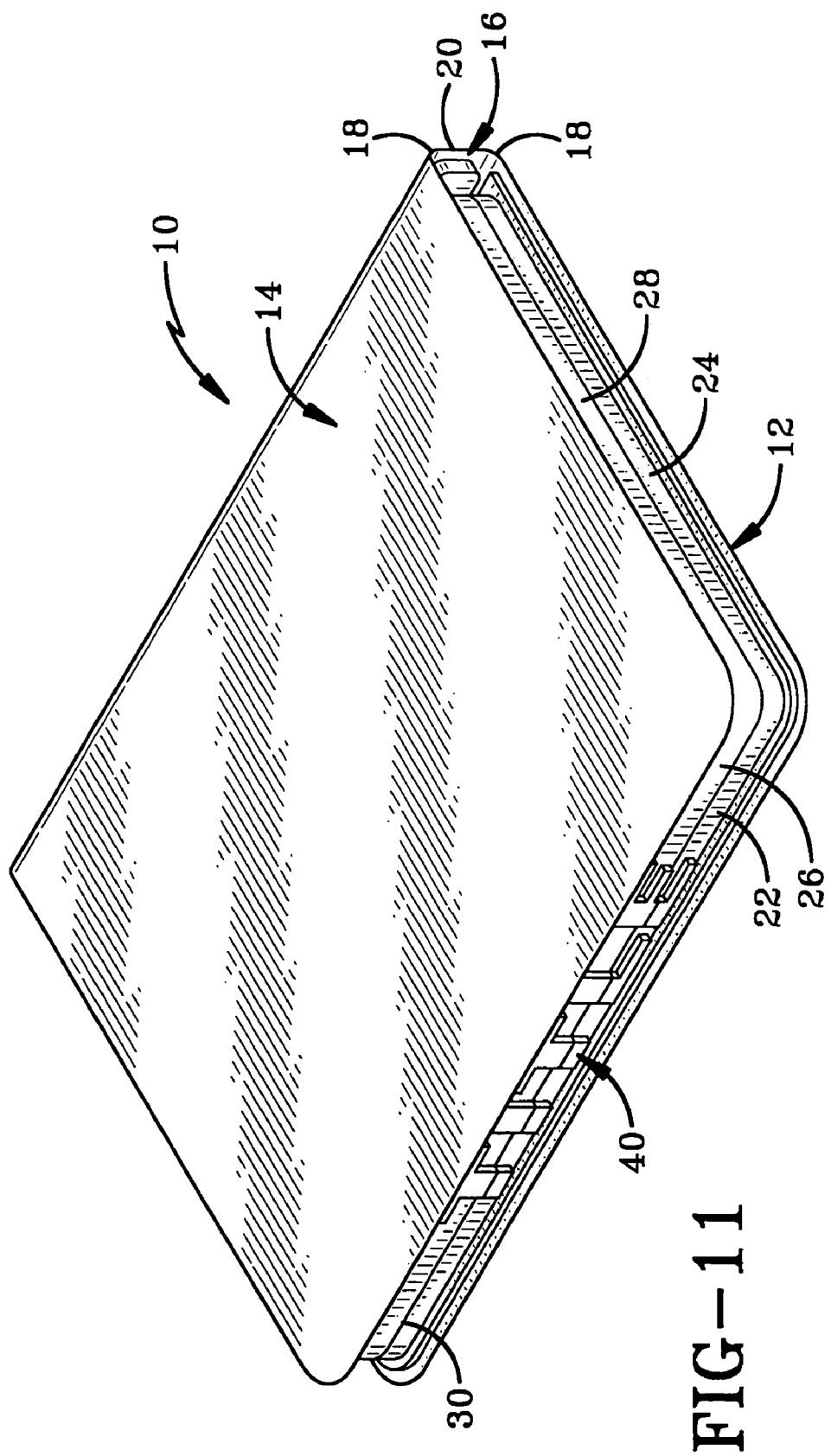
FIGS. 11–20 show the above-identified embodiments of the invention disposed on a different type of media storage container.
Figure 12:
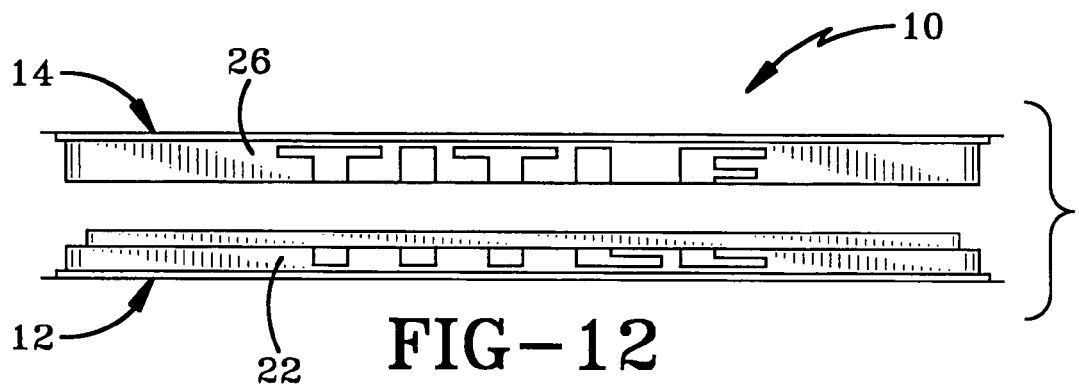
Figure 13:
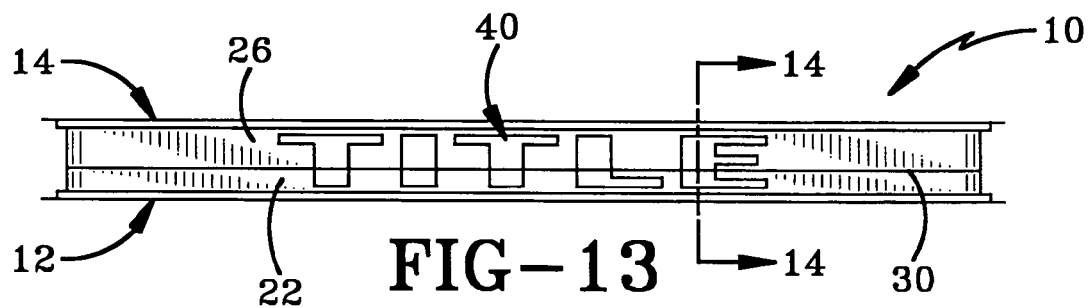
Figure 14:
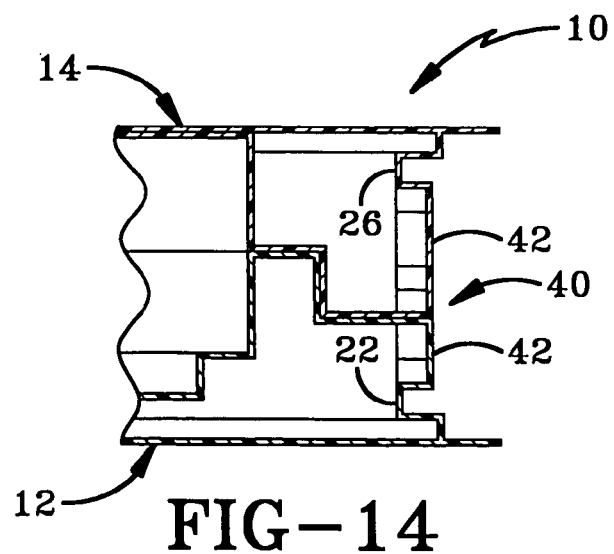
Figure 15:
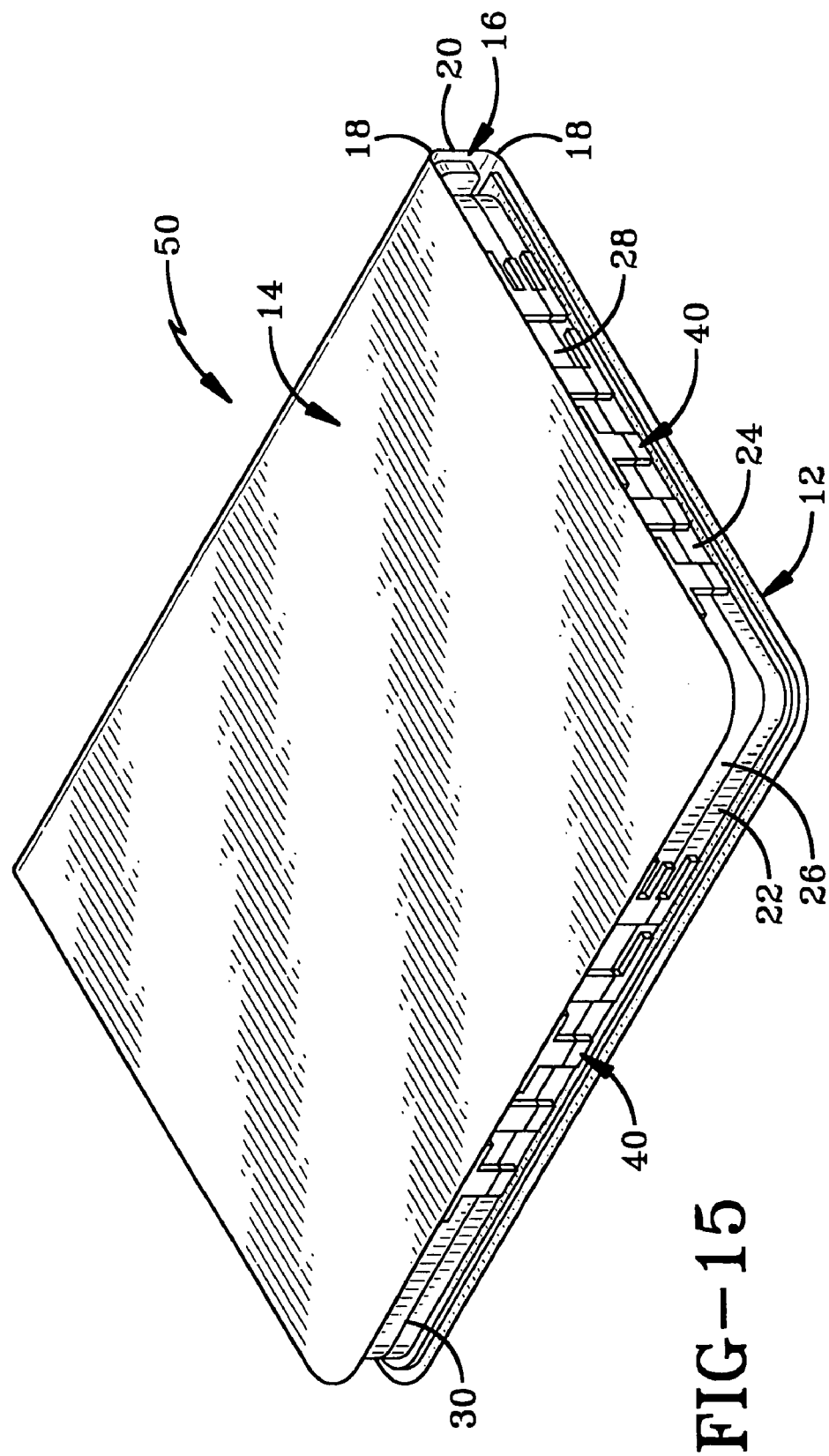
Figure 16:
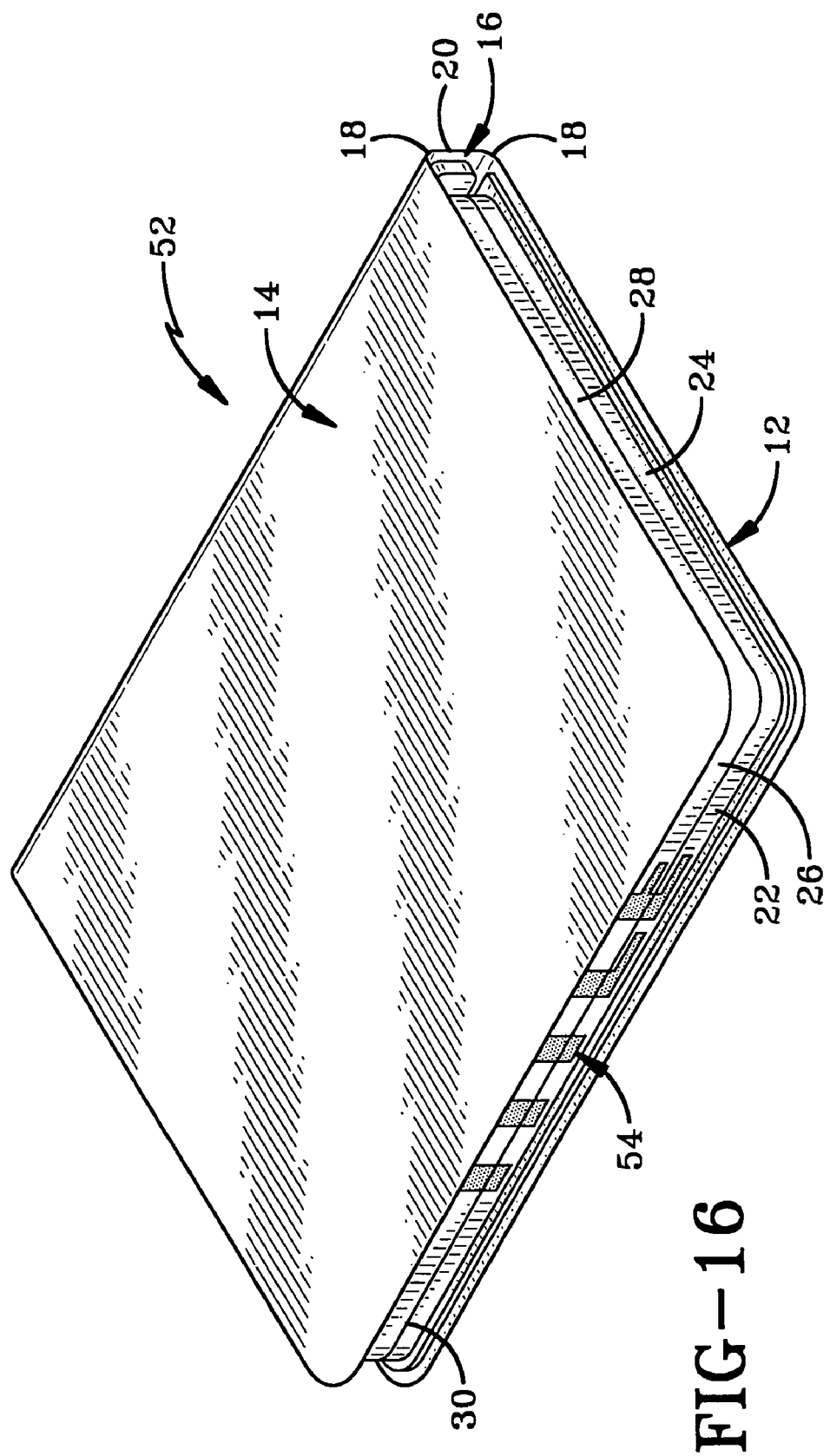
Figure 17:
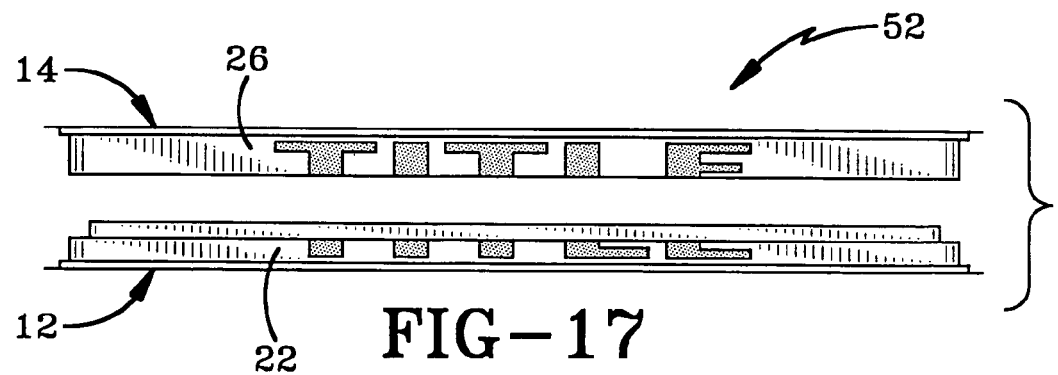
Figure 18:
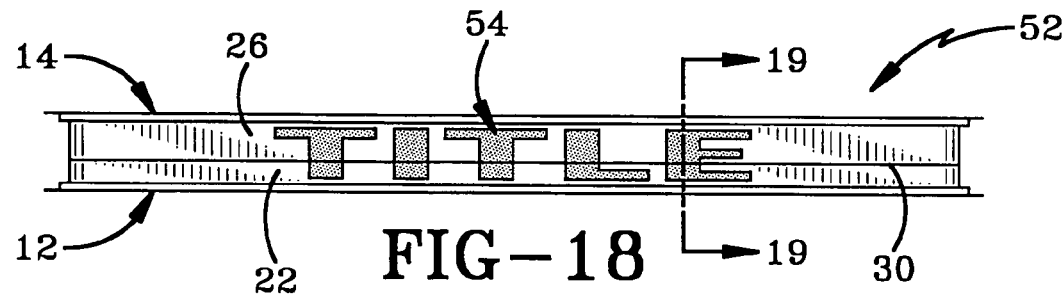
Figure 19:
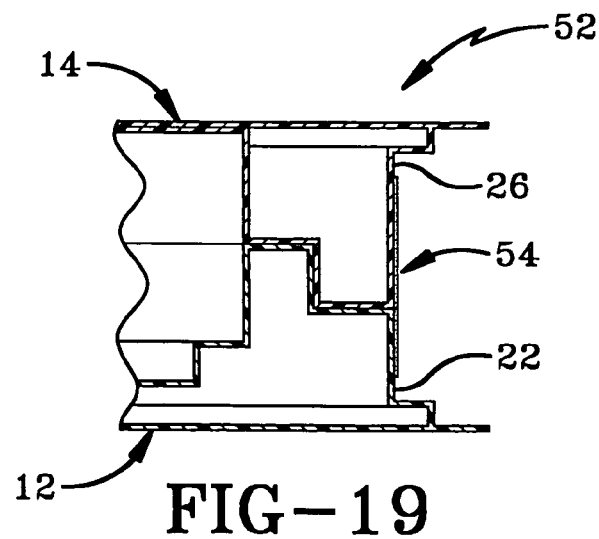
Figure 20:
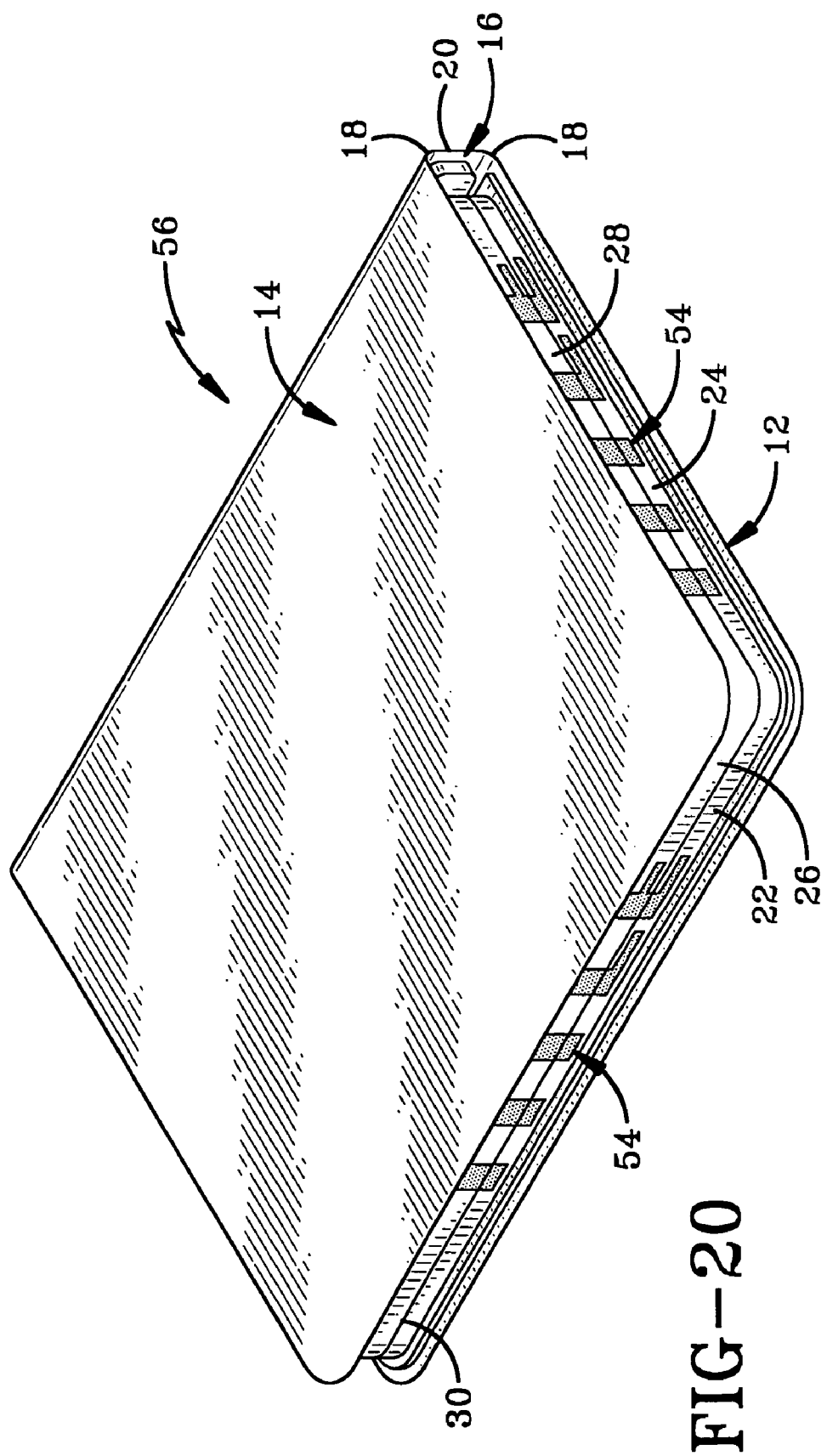

A fourth embodiment 56 is depicted in FIG. 10 wherein letter or word 54 is disposed on sidewalls 24 and 28.

FIGS. 11–20 show the above-identified embodiments of the invention disposed on a different type of media storage container.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described. For example, the containers depicted in the drawings are vacuum-formed containers. These are provided as an example. The invention may be applied to media storage containers that are fabricated through other methods known in the art.

What is claimed is:

1. A media storage container comprising:
   a base having a front wall;
   a lid having a front wall;
   the base and lid being moveable between open and closed positions;
   the base front wall being adjacent the lid front wall when the base and lid are in the closed position;
   a first letter portion disposed on the base front wall;
   a second letter portion disposed on the lid front wall;
   the first and second letter portions cooperating to form a whole letter portion when the base and lid are in the closed position; and
   an item of recorded media carried by the base and lid when the base and lid are closed; the item of recorded media having a title; wherein the letter portions form the title of the item of recorded media.

2. The media storage container of claim 1, wherein the base and lid are joined with a hinge; the front walls of the base and lid being disposed opposite the hinge.

3. The media storage container of claim 1, wherein the letter portions are raised with respect to the front walls.

4. The media storage container of claim 1, wherein the letter portions are printed on the front walls.

5. A media storage container comprising:
   a base having a sidewall;
   a lid having a sidewall;
   the base and lid being moveable between open and closed positions;
   the base sidewall being adjacent the lid sidewall when the base and lid are in the closed position;
   a first letter portion disposed on the base sidewall;
   a second letter portion disposed on the lid sidewall;
   the first and second letter portions cooperating to form a whole letter when the base and lid are in the closed position; and
   an item of recorded media carried by the base and lid when the base and lid are closed; the item of recorded media having a title; wherein the letter portions form the title of the item of recorded media.

6. The media storage container of claim 5, wherein the base and lid are joined with a hinge; the sidewalls of the base and lid being disposed substantially perpendicular to the hinge.

7. The media storage container of claim 5, wherein the letter portions are raised with respect to the sidewalls.

8. The media storage container of claim 5, wherein the letter portions are printed on the sidewalls.

9. A media storage container comprising:
   a base having a front wall and a pair of sidewalls;
   a lid having a front wall and a pair of sidewalls;
   the base and lid being moveable between open and closed positions;
   an item of recorded media disposed between the base and lid when the base and lid are in the closed position;
   the base front wall and respective base sidewalls being adjacent the lid front wall and respective lid sidewalls when the base and lid are in the closed position;
   a first graphical element portion disposed on at least one of (i) the base front wall or (ii) at least one of the respective base sidewalls;
   a second graphical element portion disposed on at least one of (i) the lid front wall or (ii) at least one of the respective lid sidewalls;
   the first and second graphical element portions cooperating to form a whole graphical element when the base and lid are in the closed position; and
   the whole graphical element identifying the item of recorded media disposed between the base and lid when the base and lid are in the closed position.

10. The storage container of claim 9, wherein the graphical element is a letter.

11. The storage container of claim 9, wherein the graphical element is a word.

12. The storage container of claim 9, wherein graphical elements are disposed on the base and lid front walls and on at least one of the two base and lid sidewalls.

13. The storage container of claim 9, wherein the base and lid are joined with a hinge; the front walls of the base and lid being disposed opposite the hinge, and the sidewalls of the base and lid being disposed substantially perpendicular to the hinge and the front walls.

14. The storage container of claim 9, wherein the graphical element portions are raised with respect to the front walls and/or the sidewalls.

15. The storage container of claim 9, wherein the graphical element portions are printed on the front walls and/or the sidewalls.

16. The storage container of claim 9, wherein the graphical element portions are recessed with respect to the front walls and/or the sidewalls.

* * * * *